(12) United States Patent
Wirbeleit et al.

(10) Patent No.: US 8,037,683 B2
(45) Date of Patent: Oct. 18, 2011

(54) FLOW-OPTIMIZED BYPASS FOR TURBO ENGINES

(75) Inventors: Friedrich Wirbeleit, Esslingen (DE); Heinz Georg Schmitz, Kirchberg (DE); Bodo Becker, Valley (DE); Guenther Vogt, Holzkirchen (DE)

(73) Assignee: Robert Bosch GmbH, Stuttgart (DE)

( * ) Notice: Subject to any disclaimer, the term of this patent is extended or adjusted under 35 U.S.C. 154(b) by 1263 days.

(21) Appl. No.: 11/653,464

(22) Filed: Jan. 11, 2007

(65) Prior Publication Data

US 2010/0251709 A1    Oct. 7, 2010

(30) Foreign Application Priority Data

Jan. 12, 2006   (DE) .................... 10 2006 001 571

(51) Int. Cl.
*F02D 23/00*    (2006.01)
(52) U.S. Cl. ........................................................ 60/602
(58) Field of Classification Search .................. 60/600, 60/602; 123/564
See application file for complete search history.

(56) References Cited

U.S. PATENT DOCUMENTS

| | | | | |
|---|---|---|---|---|
| 3,104,520 | A * | 9/1963 | Cazier et al. | 60/602 |
| 5,119,633 | A * | 6/1992 | Brooks et al. | 60/602 |
| 5,579,643 | A * | 12/1996 | McEwen et al. | 60/602 |
| 5,584,181 | A * | 12/1996 | Jinnouchi | 60/602 |
| 6,202,413 | B1 * | 3/2001 | Baker et al. | 60/602 |
| 6,767,185 | B2 * | 7/2004 | Martin et al. | 60/602 |
| 7,272,929 | B2 * | 9/2007 | Leavesley | 60/602 |

FOREIGN PATENT DOCUMENTS

| | | | |
|---|---|---|---|
| DE | 3101131 A1 * | 8/1982 | |
| EP | 34765 A1 * | 9/1981 | |
| JP | 55025505 A * | 2/1980 | |

* cited by examiner

*Primary Examiner* — Mary A Davis
(74) *Attorney, Agent, or Firm* — Kenyon & Kenyon LLP

(57) ABSTRACT

A charging device (supercharger) for internal combustion engines, having at least one turbine part. A mass stream of exhaust gas flows into this via an inflow region, from which a bypass duct branches off for bypassing the at least one turbine part. The bypass duct opens out into a turbine outlet duct at an outlet location in back of the turbine part. The bypass duct is opened or closed either by a first control element situated in the inflow region at the inlet of the bypass duct or by a second control element at the outlet of the bypass duct leading into the turbine outlet duct.

8 Claims, 4 Drawing Sheets

FLOW-OPTIMIZED BYPASS FOR TURBO ENGINES

BACKGROUND INFORMATION

An exhaust-gas turbocharger and a method for improving its efficiency are described in German Patent Application No. DE 31 01 131. The exhaust-gas turbocharger has an overrun control valve (safety valve) and an integrated bypass duct, which opens out into the exhaust duct, in back of the turbine part. The discharged bypass mass stream is expanded in an injector nozzle for generating kinetic energy, the expanded bypass mass stream being introduced into the mass stream of exhaust gas in such a manner, that the back pressure in back of the turbine part decreases. The discharge of the bypass duct into the exhaust duct in the form of an injector nozzle is designed so that it introduces the bypass mass stream into the mass stream of exhaust gas of the turbine in parallel or at an acute angle. According to German Patent Application No. DE 31 01 131, the angle formed between the bypass mass stream and the mass stream of exhaust gas is less than 30°.

The power limit of a charging device (supercharger), such as an exhaust-gas turbocharger, is expanded, for example, using two-stage controlled supercharging, as is known from the Bosch Automotive Handbook, 23rd Edition, Vieweg, 1999, pp. 445-446. In two-stage controlled supercharging, two exhaust-gas turbochargers of different size are connected in series. The mass stream of exhaust gas initially flows into an exhaust manifold. From here, the mass stream of exhaust gas is expanded via a high-pressure turbine. In the case of large amounts of exhaust gas, as occur at high engine speeds, a part of the mass stream of exhaust gas may be rerouted around the high-pressure turbine via a bypass. The entire mass stream of exhaust gas is then utilized by a low-pressure turbine downstream from the high-pressure turbine. The mass stream of fresh air drawn in is initially precompressed by a low-pressure stage and subsequently compressed further in the high-pressure stage. The mass stream of fresh air is ideally intercooled between the low-pressure stage and the high-pressure stage.

At approximately 50% to 60% of the rated speed, most of the exhaust gas is directed around the high-pressure turbine via a bypass. Since the entrance to the high-pressure turbine is not closed, exhaust gas continues to flow through the high-pressure turbine. The high-pressure compressor is simultaneously bypassed via a charge-air line, in which a nonreturn valve is provided, in order to prevent charge air from flowing back through the charge-air line during operation of the high-pressure compressor.

Two-stage supercharging in a charging device is generally accomplished by two exhaust-gas turbochargers connected in series. This allows two-stage expansion via the two turbine parts of the two exhaust-gas turbochargers to be achieved, like two-stage compression on the compressor side of the two exhaust-gas turbochargers interconnected in series. The disadvantages of uncontrolled, two-stage supercharging are prevented by control elements for bypassing the high-pressure turbine and the high-pressure compressor.

The above-described, two-stage supercharging is becoming increasingly important in the evolution of charging systems for internal combustion engines. Because of the fact that in the course of the two-stage controlled supercharging of an internal combustion engine, a part of the exhaust gases is conveyed directly from the internal combustion and the high-pressure compressor to the low-pressure compressor, it is exceedingly important that this exhaust-gas stream be conveyed in an extremely low-loss manner. German Patent Application No. DE 31 01 131 does show a bypass-duct design approach, but it describes circumference-angle requirements, which only produce the desired jet-pump effect to a limited extent.

SUMMARY OF THE INVENTION

According to the design approach provided by the present invention, a bypass system, which has, as a special feature, a flap valve designed to be optimized with respect to flow, is integrated into a turbine housing of a charging device, such as an exhaust-gas turbocharger. Even in the case of small and medium opening angles, this produces low-turbulence flow of the mass stream of exhaust gas into a ring-type bypass duct, from which the amount of bypass gas flowing around the turbine part flows through an annular inflow cross-section into the exhaust-gas stream directed through the turbine part, along the entire circumference, at a pressure p④.

A pressure greater than above-mentioned pressure p④ is produced in a ring-type bypass duct of the bypass system as a function of the amount of exhaust gas flowing through the bypass system. If the mass flow rate of exhaust gas passing through the ring-type bypass duct is very large and the pressure in the ring-type bypass duct is consequently only a little lower than a pressure p① that is present in the inflow duct in front of the turbine, then a jet constriction for the mass stream of exhaust gas coming from the turbine part, along with subsequent expansion, is achieved at the outlet of the exhaust-gas stream passing through the ring-type bypass duct, to the turbine outlet duct. This produces a jet-pump effect. The jet-pump effect brought about in this manner minimizes the friction losses, which results in a higher exhaust-gas enthalpy in front of the low-pressure turbine, so that the overall efficiency of two-stage supercharging systems for internal combustion engines may be increased.

However, if the mass flow rate of exhaust gas passing through the ring-type bypass duct is low and the pressure in the inflow region approximately corresponds to pressure p④, then the gas jet emerging from the turbine outlet cross-section is prevented from bursting through at the turbine outlet cross-section by the amount of bypass exhaust gas flowing in at approximately the same pressure. On the basis of this, a diffuser effect is produced, by which the pressure drop from p① in the direction of p④ is increased and the efficiency of the turbine part may be increased. On one-stage superchargers, the ring-type bypass duct design always produces an increase in the usable turbine pressure drop.

The bypass flap should be designed in such a manner, that it makes an effective seal in its closed position, and that, on the other hand, it is situated between the turbine inlet and the bypass duct to produce as little resistance as possible, so that even in the case of small openings of the bypass flap, the bypass stream, i.e. the part of the mass stream of exhaust gas directed past the turbine part, lies as close to the duct wall as possible. In addition, the bypass duct may also be integrated into the housing of the supercharger in such a manner, that it is designed to run slightly conically, beginning at the flap, or designed as a diffuser, so that a recovery of pressure is already achieved at the inflow to the outlet cross-section.

A sliding sleeve, which is installed downstream from the ring-type bypass duct, forms an alternative embodiment of the bypass flap in the form of a control element. The sliding sleeve may be advantageously designed so that the inflow to the ring-type bypass duct may be manufactured to be favorable to flow, without any flow obstruction. The turbine wheel sets the mass stream of exhaust gas into angular motion about the axis of symmetry in the turbine outlet duct. In order to minimize the friction losses from the ring-type bypass duct to the turbine outlet duct, it may be advantageous to design the bypass duct in such a manner, that an angular motion about the axis of symmetry is imparted on the discharged gas, the angular motion being in the same rotational direction as the mass stream of exhaust gas flowing out of the turbine wheel. As an alternative to the spatial routing of the bypass duct, swirl inserts may also be used in the ring-type bypass duct or the ring-type bypass duct may be appropriately shaped, in order to generate the angular motion in the desired form.

DETAILED DESCRIPTION

Figure 1:
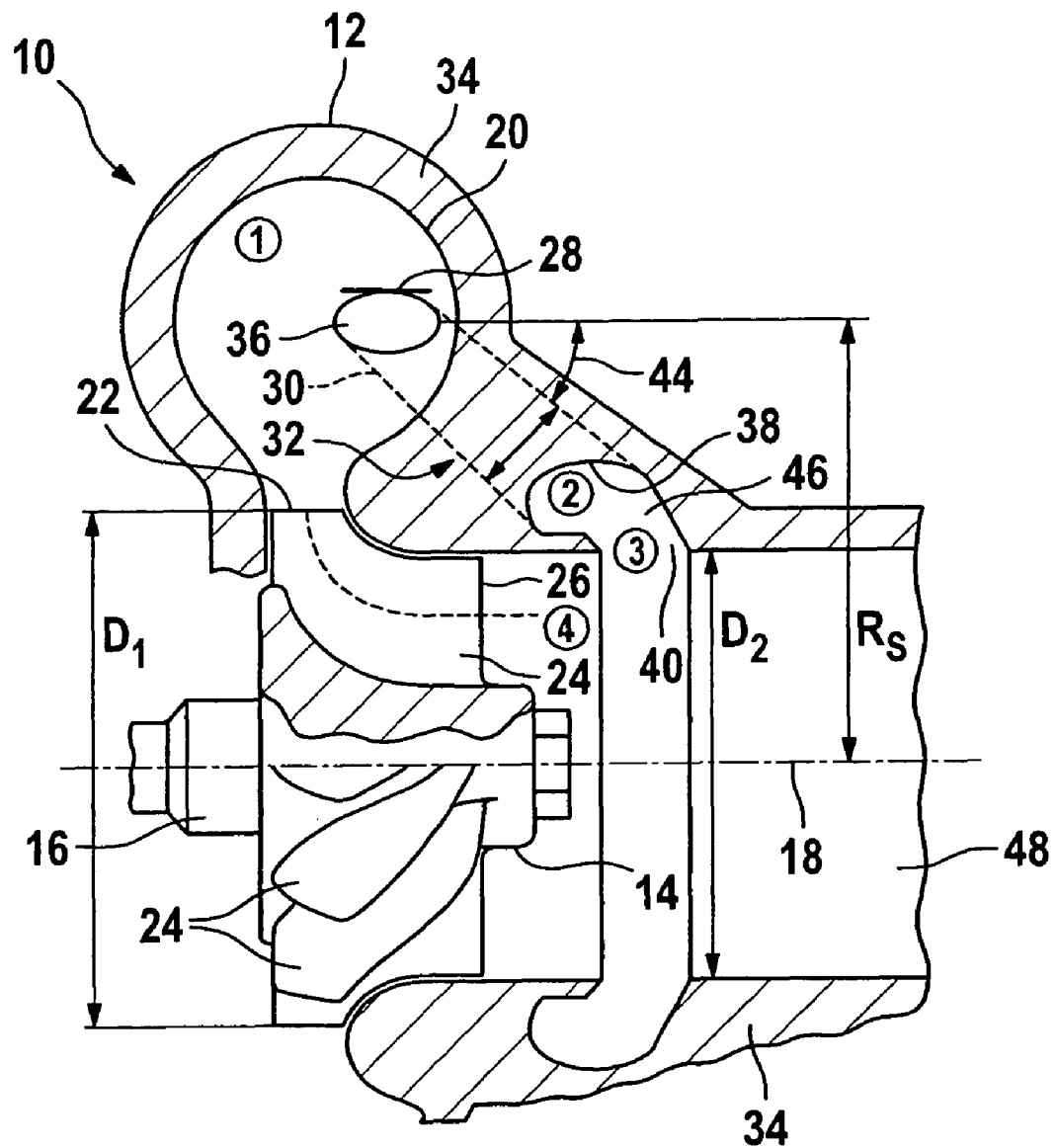
FIG. 1 shows a turbine wheel of a turbine part of a supercharger having a conically running bypass duct provided with a bypass flap.

The representation of FIG. 1 includes a partial section of a charging device, where a conically running bypass duct is formed inside a housing of the turbine part of the charging device.

A charging device 10, thus, for example, an exhaust-gas turbocharger, includes a turbine part 12 having a turbine wheel 14. Turbine wheel 14 is mounted on a shaft 16, which receives turbine wheel 14 and a compressor wheel of charging device 10, not shown in FIG. 1. The axis of symmetry of shaft 16 is denoted by reference numeral 18. A mass stream of exhaust gas flows into an inlet cross-section 22 of turbine wheel 14 via an inflow region (spiral duct) 20, the mass stream of exhaust gas being directed over turbine blades 24 of turbine wheel 14 and being expanded in the process. The state of the exhaust gas of the mass stream of exhaust gas in inflow region (spiral duct) 20 is denoted by ①; the state of the exhaust gas in the turbine outlet duct is denoted by the numeral ④.

Turbine wheel 14 of charging device 10 is in a housing 34 of turbine part 12. A bypass duct 30 runs inside of housing 34. Bypass duct 30 is assigned a bypass flap 28 on the inflow side. A partial stream of the mass stream of exhaust gas flowing in through inflow region (spiral duct) 20 may be directed past turbine wheel 14 into a turbine outlet duct 48 formed in housing 34, as a function of the opening position of bypass flap 28.

Bypass duct 30, which is integrated into housing 34 of turbine part 12, has a conical shape 32. Bypass duct 30 widens continuously in the direction of flow from its inlet 36 to its outlet 38. The exhaust gas assumes a state ② at outlet 38 of bypass duct 30 in housing 34 of turbine part 12. The partial stream of exhaust gas directed through bypass duct 30 enters turbine outlet duct 48 at an outlet location 40 in back of outlet cross-section 26 of turbine wheel 14. The diameter at inlet cross-section 22 of turbine wheel 14 is denoted by $D_1$, and the diameter of turbine wheel 14 at outlet cross-section 26 is denoted by $D_2$. The distance between the intended intersection of the center line of bypass duct 30 with bypass flap 28 and axis of symmetry 18 of shaft 16 of turbine wheel 14 is denoted by $R_S$.

The state variables of the exhaust gas are defined below: State ① defines the state of the exhaust gas in inflow region (spiral duct) 20, that is, at bypass flap 28 prior to entering bypass duct 30, as well. State ② denotes the state of the exhaust gas after passing through the bypass duct 30 running slightly conically in FIG. 1. State ③ denotes the state of the exhaust gas at the location where bypass duct 30 opens out into turbine outlet duct 48, and state ④ denotes the state of the exhaust gas, which it assumes after passing through outlet cross-section 26 of turbine wheel 14, i.e., in the expanded state of the exhaust gas.

Conical shape 32 of bypass duct 30 in housing 34 of turbine part 12 allows bypass duct 30 to act as a diffuser in the embodiment variant represented in FIG. 1. The opening angle (cone angle) achieved by conical shape 32 of bypass duct 30 is between 5° and 9°. This allows a recovery of pressure to be achieved during the flow of the partial exhaust-gas stream from inlet 36 of bypass duct 30 to its outlet 38, when bypass flap 28 is open. It follows from the view according to FIG. 1 that at outlet 38, bypass duct 30 opens out into a ring-type duct 46, which, for its part, has an opening, which runs annularly in turbine outlet duct 48, and via which the partial mass stream of exhaust gas passing through bypass duct 30 is reintroduced into the mass stream of exhaust gas expanded in the turbine.

If the mass flow rate of the partial stream of exhaust gas passing through bypass duct 30 is very high and the pressure in ring-type duct 46 is consequently only a little less than p①, then this pressure produces, at outlet location 40, a jet restriction for the mass stream of exhaust gas exiting turbine wheel 14 at its outlet cross-section 26, along with subsequent expansion, and therefore produces a jet-pump effect. In this manner, the friction losses at a two-stage charging device between a high-pressure turbine and a low-pressure turbine connected to it in series are minimized. This allows a recovery of pressure due to the diffuser effect from conical shape 32 of bypass duct 30, and therefore an increase in energy in front of the low-pressure turbine. In the case of single-stage charging, the described variant always produces an increase in the usable turbine pressure drop.

If, however, the mass flow rate of the partial exhaust-gas stream passing through bypass duct 30 is low and the pressure at outlet location 40 of ring-type duct 46 leading into turbine outlet duct 48 is consequently low, then the gas jet emerging from this cross-section is prevented from bursting through by the partial amount of exhaust gas, which flows in at approximately the same pressure and passes through bypass duct 30, which means that a diffuser effect may be achieved. The pressure difference between pressure p① in inflow region (spiral duct) 20 and pressure p④ at turbine-outlet cross-section 26 is increased, which means that the turbine efficiency in a charging device 10 may be increased. Therefore, in the case of a second, downstream turbine, the exhaust-gas enthalpy increased by the improvement in efficiency may be converted into power. An increase in the usable turbine pressure drop may always be achieved.

Bypass flap 28 is designed so that, on one hand, it seals bypass duct 30 in its closed position, and on the other hand, it is positioned between inlet cross-section 22 of turbine wheel 14 and bypass duct 30 to cause low resistance, so that even when the opening of bypass flap 28 is small, the partial mass stream of exhaust gas comes to rest at (contacts) the wall of the duct. The contact of the flow of the partial exhaust-gas stream in the conical inflow duct leading to ring-type bypass duct 46 reduces the flow velocity, which means that a recovery of pressure may be achieved.

Figure 2:
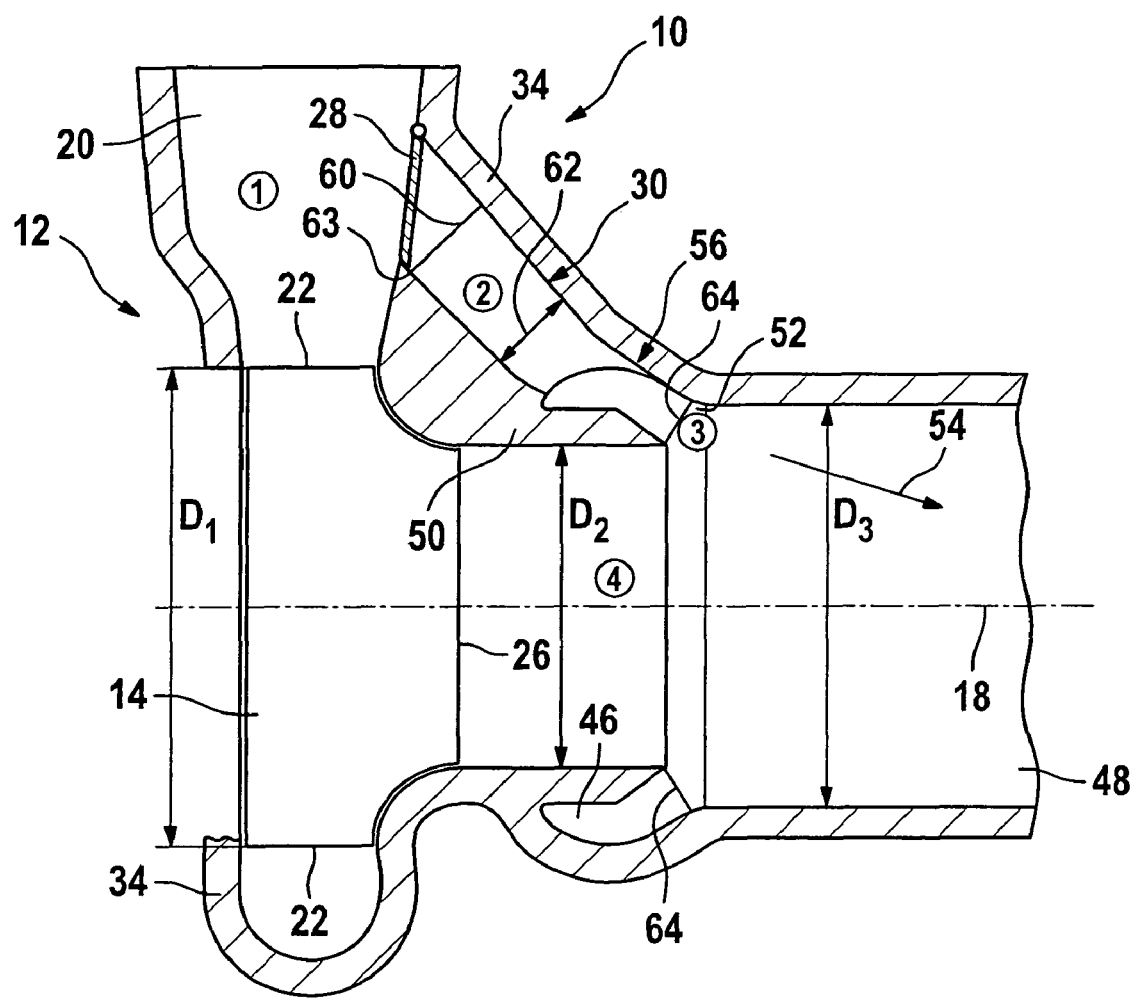
FIG. 2 shows an alternative embodiment variant of a bypass duct, which is closed by a bypass flap and provides nozzle/diffuser action.

FIG. 2 is a further embodiment variant of the means provided for achieving the object of the present invention, where turbine outlet duct 48 widens at the mouth of ring-type bypass duct 46. The increase in area at ring-type bypass duct 46 intensifies the desired jet-pump effect, in that the mass stream of exhaust gas flowing through turbine wheel 14 is guided through the bypass exhaust-gas mass stream flowing in at a higher velocity, and is accelerated. Bypass duct 30 may also be spatially designed to open conically with the advantages described above, or, in the same way, to have a uniform cross-section or also a narrowing cross-section.

It follows from the view of FIG. 2 that charging device 10 also has turbine part 12, in which turbine wheel 14 is mounted so as to be symmetrical with respect to axis of symmetry 18. Bypass flap 28 is situated in inflow region (spiral duct) 20, so that on one hand, it seals bypass duct 30 in its closed position and, on the other hand, it does not constitute an obstacle to flow for the exhaust-gas stream flowing into inlet cross-section 22 of turbine wheel 14 in inflow region (spiral duct) 20. Turbine wheel 14 has a diameter $D_1$ at inlet cross-section 22 and diameter $D_2$ at outlet cross-section 26.

Bypass duct 30, which is sealed by closed bypass flap 28, runs in housing 34 of turbine part 12. The cross-section of bypass duct 30 changes from an inlet cross-section 60 into a cross-section 62 and opens out into ring-type bypass duct 46, which has set-back outlet location 52 leading to turbine outlet duct 48. Bypass duct 30 opens into bypass duct 46, which in turn opens into turbine outlet duct 48 at its outlet cross-section 64 at outlet location 52.

Set-back outlet location 52 is achieved in that turbine outlet duct 48 has a larger diameter $D_3$ in back of set-back outlet location 52 than diameter $D_2$ of turbine outlet duct 48 directly behind outlet cross-section 26 of turbine wheel 14. This produces a jump in diameter between a turbine outlet pipe 50 of housing 34, whereby set-back outlet location 52 of bypass duct 30 leading into turbine outlet duct 48 is formed. The jet effect, which is achieved by the bypass stream at outlet cross-section 64 of bypass duct 30 according to the representation in FIG. 2, is indicated by reference numeral 54.

Figure 3:
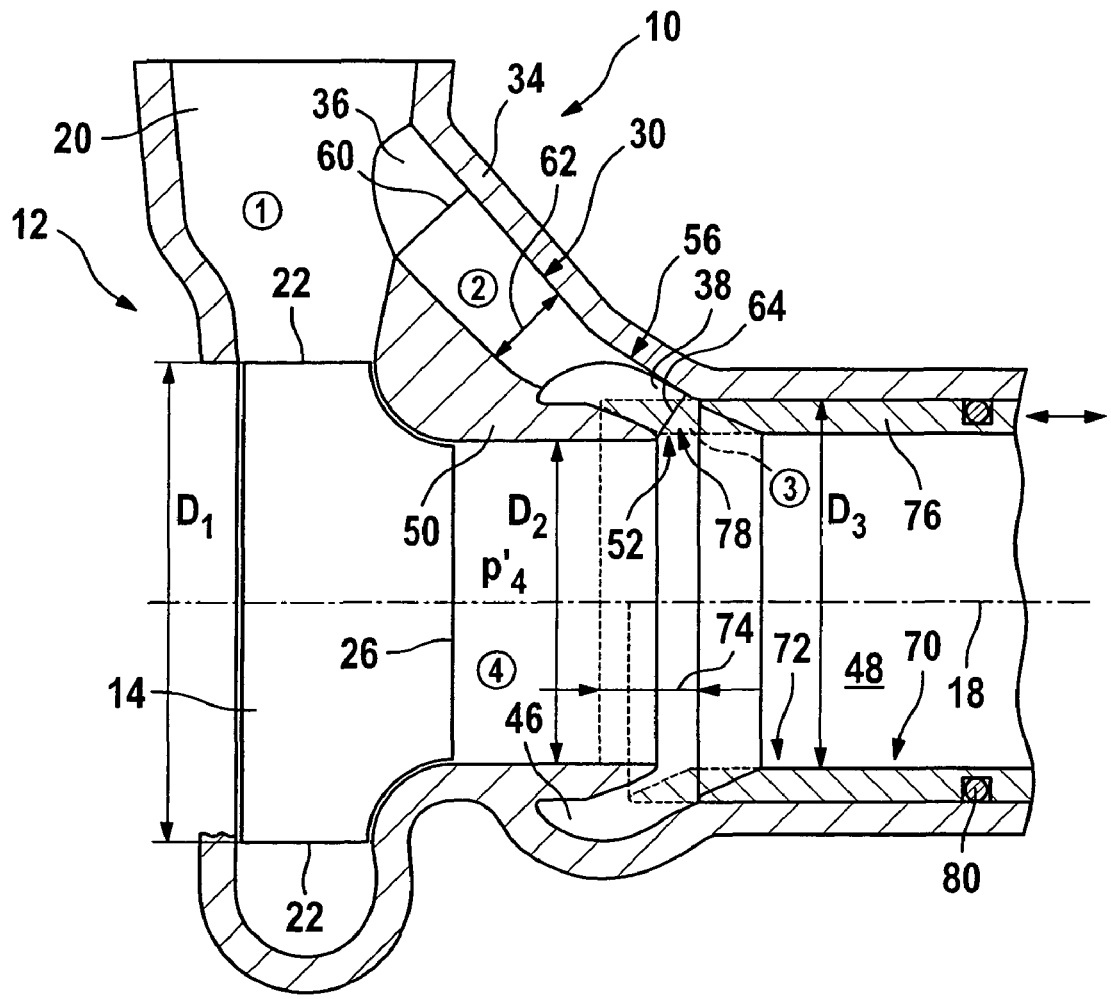
FIG. 3 shows an embodiment variant of a bypass duct according to FIG. 2, which may be opened or closed with the aid of a sleeve-shaped, sliding control valve.

The view of FIG. 3 shows a further embodiment variant of the concept forming the basis of the present invention, where a sliding control valve, which is integrated in turbine outlet duct 48 and is movable relative to it, is formed in place of a bypass flap.

While in the embodiment variants according to FIGS. 1 and 2, bypass duct 30 is controlled by a flap-shaped control element 28 at inlet 36 of bypass duct 30, the embodiment variant represented in FIG. 3 allows bypass duct 30 for the partial mass stream of exhaust gas to be directed past turbine wheel 14 to be controlled at outlet 38 of bypass duct 30, using a sleeve-shaped control element 70. Bypass duct 30 according to the embodiment variant represented in FIG. 3 essentially corresponds to bypass duct 30 already described in connection with FIG. 2, having cross-section 56 and outlet cross-section 64 at outlet location 52 leading into turbine outlet duct 48. In the embodiment variant represented in FIG. 3, the jump in diameter from diameter $D_2$ at outlet cross-section 26 of turbine wheel 14 and to diameter $D_3$ of turbine outlet duct 48 in back of set-back outlet location 52 is used for receiving a sleeve-shaped control element 70. This is movable relative to the wall of turbine outlet duct 48 in accordance with the double arrow and may be set in any operating position 72 between the limit stops. Using sleeve-shaped control element 70 according to the embodiment variant in FIG. 3, bypass duct 30 is now not opened at its inlet 36, but rather opened, closed, or partially unblocked at its outlet 38 at set-back outlet location 52 as a function of the position of control element 70.

Set-back outlet location 52 may now be continuously moved according to control path 74 between an operating position 72, in which outlet cross-section 64 is completely unblocked at set-back outlet location 52, and the limit stop at turbine outlet pipe 50, in which control element 70 moves into set-back outlet location 52 and consequently completely seals outlet cross-section 64 of bypass duct 30. Sleeve-shaped control element 70 slidable inside of turbine outlet duct 48 may have a bevel, which is designed with regard to flow guidance and sealing and, in end position 78, rests against a complementary end of turbine outlet pipe 50 and completely seals ring-type bypass duct 46. For one thing, the embodiment variant shown in FIG. 3 eliminates the need for a bypass flap 28 as a control element, which is advantageous in that the inflow to ring-type duct 46 may be implemented without any flow obstruction. Depending on the purpose and requirements of the application, the sealing action between control element 70 taking the form of a sleeve 76, and housing 34, may be improved by inserting a sealing device.

In FIG. 3, this seal between control element 70 taking the form of sleeve 76, and housing 34, is indicated by reference numeral 80.

Figure 4:
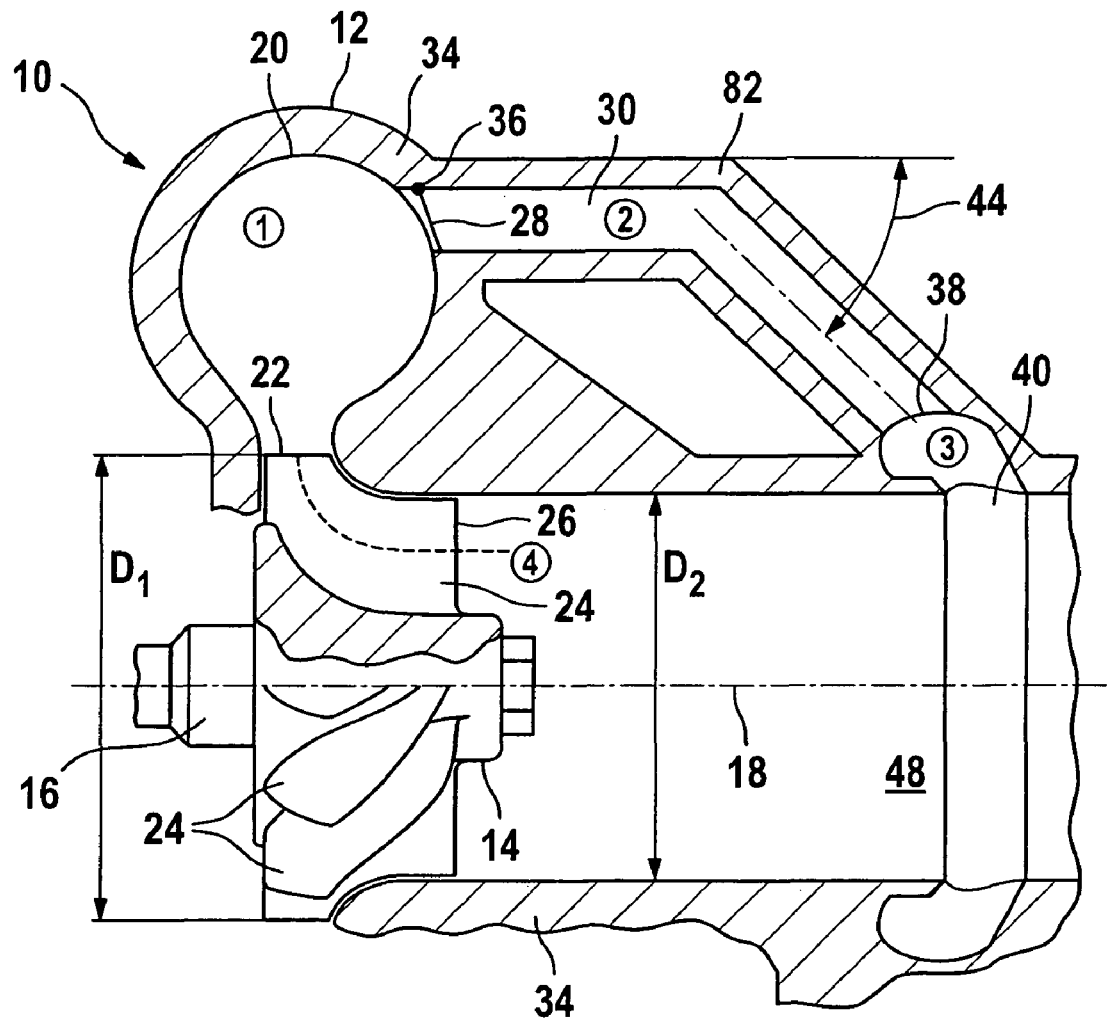
FIG. 4 shows an embodiment variant of the bypass duct represented in FIG. 1.

FIG. 4 represents an embodiment variant of the bypass duct shown in FIG. 1.

According to the view in FIG. 4, bypass duct 30, which is integrated into turbine part 12 in the above-described embodiment variants, may also be externally routed in a corresponding pipe 82. A connection and an opening to inflow region (spiral duct) 20 are necessary for this, as well as a circumferential ring-type duct around turbine outlet duct 84, into which pipe 82 opens out. The two embodiment variants shown, both upstream-mounted bypass flap 28 and control element 70 taking the form of sleeve 76, may be used as a control element. In a manner analogous to the preceding embodiment variants, pipe 82 may be designed to have a constant diameter over the length of the pipe, or may also be designed to open up or to narrow. According to this embodiment variant, pipe 82 of bypass duct 30 may be designed so that, in particular, angular motion of the mass stream of exhaust gas about axis of symmetry 18 is generated inside ring-type bypass duct 46. This prevents sheer flows (currents) between the mass stream of exhaust gas directed through bypass duct 30, relative to the mass stream of exhaust gas in turbine outlet duct 48, which means that the friction losses during the meeting of the two mass streams of exhaust gas are minimized and, in this manner, the jet-pump effect is maximized.

The embodiment variants of first, flap-shaped control element 28 and second, sleeve-shaped control element 70 explained in detail in the above exemplary embodiments are controlled in view of the data important for the engine, such as boost pressure and exhaust-gas back pressure. In order to control first or second control element 28, 70, in addition to these parameters, data relevant to exhaust-gas purification, such as a negative flushing or exhaust-gas discharge gradient or the exhaust-gas temperature, or safety-related parameters such as the speed of charging device 10, as well as the engine load, i.e. the torque to be set, may also be used as parameters for controlling first flap-shaped control element 28 and second control element 70 in the form of a sleeve that slides in turbine outlet duct 48.

What is claimed is:
1. A charging device for an internal combustion engine, comprising:

at least one turbine part, into which a mass stream of exhaust gas flows via an inflow region;

a bypass duct branching off from the inflow region for bypassing the at least one turbine part and configured to produce a jet-pump effect;

a turbine outlet duct, the bypass duct opening out into the turbine outlet duct at an outlet location in back of the at least one turbine part;

a control element for one of opening and closing the bypass duct;

the control element is a sleeve-shaped, sliding control valve downstream from a ring bypass duct in the turbine outlet duct, and the control element is continuously movable inside a control path between an open, operating position and a closed, end position in the turbine outlet duct; and wherein the control element has a bevel on its end pointing towards the outlet of the bypass duct, the bevel being complementary to a bevel of a turbine outlet pipe of the housing, and one of (a) sealingly covering the turbine outlet pipe in the end position and (b) being sealed with respect to a housing with the aid of a sealing device.

2. The charging device according to claim 1, wherein the bypass duct opens out into the ring bypass duct in a housing, the ring bypass duct having an annularly running outlet location leading into the turbine outlet duct.

3. The charging device according to claim 2, wherein the annularly running outlet location extends over an entire circumference of the turbine outlet duct.

4. The charging device according to claim 2, wherein a cross-sectional area of the ring bypass duct corresponds to an area of an outlet cross-section of the bypass duct.

5. The charging device according to claim 2, wherein the outlet location of the bypass duct takes the form of a set-back outlet location at a region of changing diameter between a first diameter and a second diameter of the turbine outlet duct.

6. The charging device according to claim 1, wherein the bypass duct has a conical shape from its inlet to its outlet, having an opening angle between 5° and 10°.

7. The charging device according to claim 1, wherein the bypass duct is configured to impart an angular motion about an axis of symmetry on a discharged gas, wherein the angular motion is in the same rotational direction as a mass stream of exhaust gas flowing out of a turbine wheel.

8. The charging device according to claim 1, wherein the bypass duct widens continuously in the direction of flow from the inlet of the bypass duct to the outlet of the bypass duct.

* * * * *